Sept. 14, 1965  E. STOTZ ETAL  3,205,967
WHEEL GUIDE FOR INDEPENDENT WHEEL SUSPENSION
Filed Dec. 3, 1963
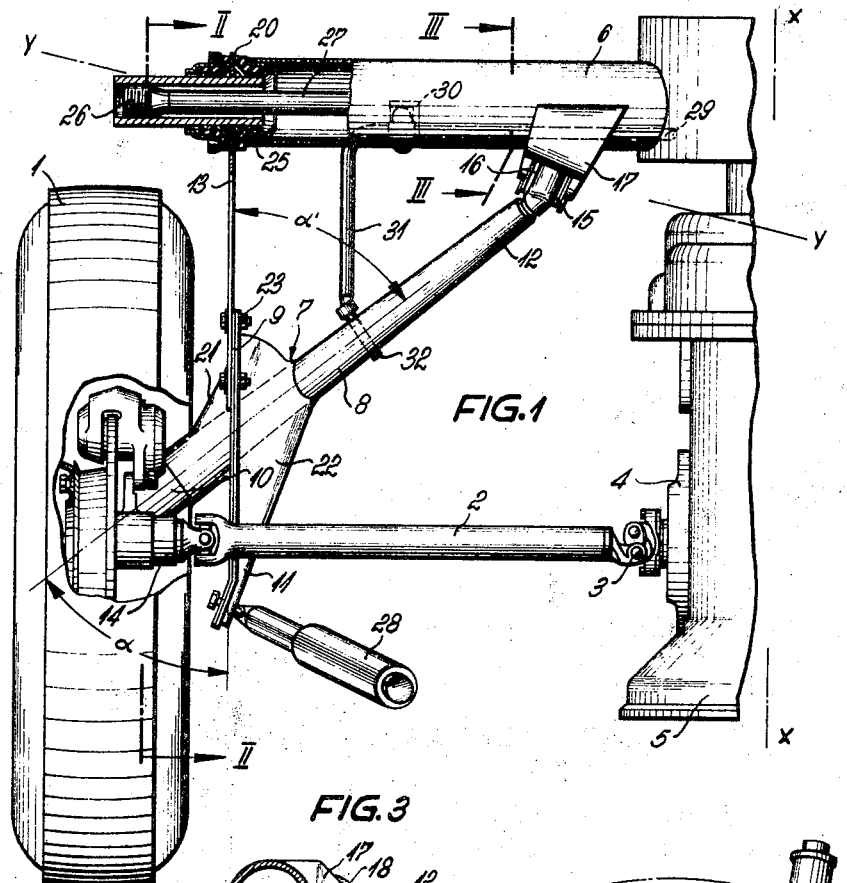
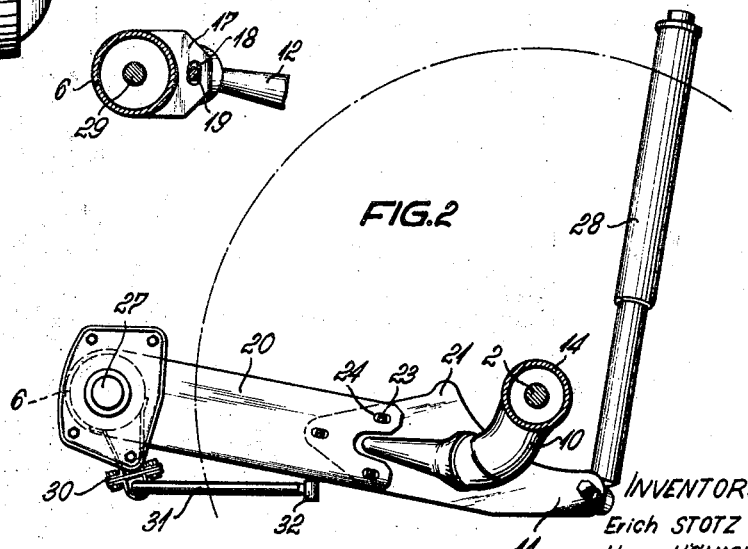
INVENTORS
Erich STOTZ
Hans HÖNICK
Wolfgang EYB
BY Dicke + Craig
his ATTORNEYS United States Patent Office 3,205,967
Patented Sept. 14, 1965

3,205,967
WHEEL GUIDE FOR INDEPENDENT
WHEEL SUSPENSION
Erich Stotz, Rommelshausen, Wurttemberg, Hans Hönick, Gerlingen, near Stuttgart, and Wolfgang Eyb, Leonberg, Wurttemberg, Germany, assignors to Firma Dr. Ing. h.c. F. Porsche KG., Stuttgart-Zuffenhausen, Germany
Filed Dec. 3, 1963, Ser. No. 327,637
Claims priority, application Germany, Dec. 6, 1962, P 30,709
13 Claims. (Cl. 180—73)

The present invention relates to a rear wheel suspension for vehicles, especially for motor vehicles in which the wheels are operatively connected with a multi-partite wheel guide member swinging essentially in the driving direction and are in driving connection with the differential gear by way of swinging drive shafts by the interposition of universal joints.

With the known constructions of this type fork-like guide members with mutually disposed V-shaped arms are provided for purposes of guiding the wheel, the ends of which are pivotally connected to the frame or body of the vehicle with the formation of a swinging axis extending through the joint of the axle shaft disposed on the side of the axle gear. The hub serving for purposes of supporting or carrying the wheel as well as the spring and damping elements are accommodated at the root of the guide arms or are supported thereon. Of the various factors determining the wheel suspension, that is the support, guidance, springing and damping of the wheel, alone three are thus coordinated with the aforementioned standard constructions of the prior art to the fork root, whereby unfavorable structural conditions necessarily result within this area and compromises with respect to springing and damping have to be accepted for spatial reasons. In order to enable longer damping paths, it has already been attempted to extend the guide member beyond the fork root in such a manner that the spring and guide elements come to lie on one side and the damping elements on the other side of the drive shaft. This arrangement, however, requires guide members of sturdy construction so that it results in a relatively heavy and correspondingly expensive construction. In order to avoid these shortcomings, it is already known for double-jointed axles to utilize as wheel guide structure a guide member constituted by a diagonal arm and a torsion-absorbent strut. However, with this type of prior art wheel suspension the lateral forces acting on the wheel have to be absorbed by the drive shaft which causes undesirably high joint loads and stresses.

According to the present invention, these disadvantages are avoided in that the wheel guide member is constituted by arms crossing one another within the area of the drive shaft, the ends of which facing the wheel subtend an angle which corresponds essentially to the angle of the ends of the arm of the wheel guide member opposite the wheel. A wheel suspension is created by such an arrangement in which the arms of the guide member resulting from the intersection thereof are available for the support, guidance, springing and damping of the wheel so that the most favorable design and construction may be selected for the suspension with respect to the spring and damping characteristics thereof. Simultaneously therewith, it is possible with a simple guide construction according to the present invention to transmit the lateral forces directly to the frame or vehicle body of a self-supporting type body construction so that the drive shafts are relieved of any wheel guiding forces. Preferably, one of the arms extends parallel to the vehicle longitudinal center plane and the inclined or obliquely directed other arm extends through this one parallel arm near the drive shaft. As a result thereof, the use of a diagonal brace or support for the wheel of simple construction is attained and at the same time, in combination with the other arm, the provision of a swinging axis of the wheel guide member extending at an acute angle to the drive shaft is made possible which affects the wheel suspension favorably.

The arm arranged parallel to the vehicle longitudinal center plane is constituted advantageously by a torsion-absorbent strut and by form-rigid shells whereby the strut is adjustably arranged at the shells and the shells are rigidly connected with the obliquely directed arm. It is thereby possible by shortening or lengthening of the arm to compensate for assembly inaccuracies and to establish in a simple manner a desired toe-in of the wheel. A favorable springing and damping of the wheel is achieved if the torsion-resistant strut is operatively connected with a torsion rod spring and the shells completed into a hollow body which are cranked or underslung below the drive shaft form the support of a shock absorber. The obliquely directed arm carries the wheel hub and, provided at the opposite end thereof with a head piece, is adjustably held in the vertical direction within a bracket connected with the frame or body of the vehicle. A camber adjustment of the wheel is then possible by a displacement of the associated bearing bolt in the vertical direction. A neat grouping as well as a well designed and engineered construction of the guide member is obtained by the appropriate distribution of the individual tasks of the wheel guide member at the respective free arm ends which is particularly suited with respect to its spatial lay-out for vehicles with a rear drive unit. Furthermore, the angularly bent arm of a torsion rod stabilizer may be pivotally connected to the obliquely directed arm of the wheel guide member within the area thereof between the head piece and the strut member.

Accordingly, it is an object of the present invention to provide a wheel suspension system, particularly for the driven rear wheels of motor vehicles, which eliminates in an effective manner and by simple means the shortcomings encountered with the prior art constructions.

It is another object of the present invention to provide a wheel suspension, especially for the driven wheels of motor vehicles which permits favorable constructional lay-out and structural conditions without compromise in the spring and damping properties of the suspension.

A further object of the present invention resides in the provision of a wheel suspension for the driven wheels of a vehicle which not only obviates particularly sturdy guide members involving relatively large weights and high expenditures but also permits relatively long damping paths during spring deflections of the wheels.

A still further object of the present invention resides in the provision of a wheel suspension for vehicle wheels, especially the driven rear wheels of a motor vehicle which assures all of the advantages mentioned hereinabove while eliminating the need for absorbing the lateral forces acting on the wheels by the drive shafts and thereby reducing the loads to which the drive shaft joints are exposed.

Still a further object of the present invention resides in the provision of a wheel suspension, especially for the driven rear wheels of motor vehicles which is so constructed and arranged that the most favorable design can be selected with respect to the spring and damping system of the suspension while simultaneously transmitting the lateral forces directly to the vehicle frame or body.

Another object of the present invention resides in the provision of a wheel suspension for the driven wheels of a vehicle consisting of two angularly disposed guide arms, which makes possible a simple construction for the diagonal supporting arm together with the realization of a relatively small angle for the swinging axis with respect to the transverse direction of the vehicle thereby favorably influencing the wheel guidance characteristics of the suspension.

A still further object of the present invention resides in the provision of a wheel suspension for the driven wheels of a vehicle which not only makes possible a simple compensation for inaccuracies in the manufacture and/or assembly together with a favorable spring and damping characteristics but also a simple adjustment of the toe-in and camber angles of the wheel.

Another object of the present invention resides in the provision of a wheel suspension of the type described hereinabove in which the individual tasks to be carried out by the wheel suspension are relegated to properly designed parts of the wheel guide elements and which additionally permits a simple and operationally reliable accommodation of a torsion rod stabilizer.

These and other objects, features and advantages of the present invention will become more obvious from the following description when taken in connection with the accompanying drawing which shows, for purposes of illustration only, one embodiment in accordance with the present invention, and wherein:

FIGURE 1 is a plan view on a rear wheel suspension of a motor vehicle, partly in cross-section, and provided with a wheel guide assembly in accordance with the present invention;

FIGURE 2 is a partial cross sectional view taken along line II—II of FIGURE 1 indicating the wheel in dash and dot line; and FIGURE 3 is a partial cross sectional view, taken along line III—III of FIGURE 1 through a frame bearer together with the support of the diagonal arm.

Referring now to the drawing wherein like reference numerals are used throughout the various views to designate like parts, and more particularly to FIGURE 1, reference numeral 1 designates therein the rear wheel of the motor vehicle which is driven from the differential gear 4 of the schematically indicated rear drive unit 5 by way of a double-jointed shaft 2 provided with an extensible universal joint 3. A wheel guide assembly generally designated by reference numeral 7 which swings or pivots substantially in the driving direction, is provided for purposes of guiding and supporting the wheel 1 with respect to the vehicle frame 6. The wheel guide structure 7 essentially consists of the arms 8 and 9 which intersect or cross one another within the area of the drive shaft 2. The arm 8 of the wheel guide structure 7 is disposed obliquely to the vehicle center longitudinal plane X—X whereas the arm 9 extends parallel with respect thereto. The ends 10 and 11 of the arms 8 and 9 facing the wheel 1 subtend therebetween an angle α which corresponds to the angle α' at which are disposed the ends 12 and 13 of the arms 8 and 9 facing the frame 6. The arm 8 which consists of a conical tubular member extends through the arm 9 and is provided at its short end 10 constructed as crank arm (FIGURE 2) with a hub portion 14 carrying the wheel 1 in its correct position. An angularly bent head piece 15 is secured to the oppositely disposed end 12 of the arm 8 which head piece 15 is pivotally supported within a bracket 17 by the interposition of a rubber bearing 16. The bracket 17 which accommodates therebetween the head piece 15 is rigidly connected with the frame cross bearer 6 and is provided with vertically arranged elongated apertures 18 for the securing bolt 19 (FIGURE 3) of the guide arm 8. The arm 9 consists of a torsion-absorbent strut 20 in the form of an upright leaf-spring and of two stamped-out sheet metal shells 21 and 22 combined into a hollow body which are rigidly connected with the arm 8. The strut 20 is adjustably held at the shells 21 and 22 by means of screws or bolts 23 in elongated apertures 24 and is operatively connected by the interposition of a rubber joint 25 and a sleeve 26 with a torsion rod spring 27 effecting the spring support of the wheel 1. The torsion rod spring 27 is, as is known per se, non-rotatably supported within the frame cross bearer 6 in any conventional manner. The end 11 of the arm 9 which is located near the wheel and formed by the shells 21 and 22 is cranked or underslung below the drive shaft 2 (FIGURE 2) and serves for purposes of support of a shock absorber 28. A torsion rod stabilizer 29 is provided for the stabilization of the wheel suspension which connects the wheel guide structures 7 on both vehicle sides. The stabilizer 29 is held at shackles, brackets, bow members 30 or the like arranged at the cross bearer 6 and is provided with an angularly bent arm 31 which extends parallel and at a distance to the strut 20. The arm 31 of the stabilizer 29 is pivotally secured or connected by means of a joint bolt 32 at the guide arm 8.

For purposes of adjusting a predetermined desired toe-in of the wheel and/or for purposes of compensation of assembly inaccuracies the securing bolts or screws 23 of the strut 20 must be loosened, whereupon by shortening or lengthening the arm 9, for example, on a test stand, the wheel is brought into the prescribed position and subsequently the bolts 23 are again tightened. The same work must be performed for adjusting the wheel camber at the arm 8. For that purpose, the securing bolt 19 of the head piece 15 is loosened and the arm 8 is displaced in the vertical direction to such an extent until the desired value of the wheel camber is attained. The adjustment of the wheel is completed after the tightening of the bolt 19.

During the spring deflection of the wheel 1 the wheel guide structure 7 swings about a pivot axis Y—Y which is determined by the rubber joint 25 of the swinging strut 20 and by the head piece 15 of the guide arm 8 and extends at an inclination to the drive shaft 2. The shortening or lengthening of the drive shaft 2 resulting from the spring deflection of the wheel is compensated for by the extensible shaft joint 3 which may be of any suitable known construction.

While we have shown and described one embodiment in accordance with the present invention, it is understood that the same is not limited thereto but is susceptible of numerous changes and modifications as known to a person skilled in the art. Thus, instead of the parallelly arranged guide arm, the diagonal arm may serve for the spring support of the vehicle wheel whereby it is of subordinate importance for the present invention by what type of spring element the spring support is realized.

Thus, it is obvious that the present invention is susceptible of numerous changes and modifications within the spirit and scope thereof, and we therefore do not wish to be limited to the details shown and described herein but intend to cover all such changes and modifications as are encompassed by the scope of the appended claims.

We claim:

1. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, the ends of said arm portions facing the respective wheel subtending an angle which essentially corresponds to the angle of the ends of said arm portions opposite said wheel, pivot means having a pivot axis for pivotally connecting one arm portion to said vehicle superstructure, the other of said arm portion being flexible and connected to said pivotal connecting means for pivoting about the swing axis substantially perpendicular to the vehicle longitudinal center plane, said pivot means having a pivot axis intersecting the vehicle longitudinal center plane rearwardly of the point of intersection of the swing axis of said pivotal connecting means therewith.

2. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, the ends of said arm portions facing the respective wheel subtending an angle which essentially corresponds to the angle of the ends of said arm portions opposite said wheel, one of said arm portions being disposed obliquely to the vehicle longitudinal center plane and the other arm portion extending substantially parallel thereto, said one arm portion extending through said other arm portion in proximity to the respective drive shaft means, the other arm portion being flexible and connected to said pivotal connecting means for pivoting about a swing axis substantially perpendicular to said vehicle longitudinal center plane, pivot means having a pivot axis for pivotally connecting said obliquely extending arm at said vehicle superstructure, said pivot means having a pivot axis which intersects the vehicle longitudinal center plane rearwardly of the point of connection of the swing axis of said pivotal connecting means therewith.

3. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, one of said arm portions being disposed obliquely to the vehicle longitudinal center plane and the other arm portion extending substantially parallel thereto, said one arm portion extending through said other arm portion in proximity to the respective drive shaft means, the other arm portion being flexible and connected to said pivotal connecting means for pivoting about a swing axis substantially perpendicular to said vehicle longitudinal center plane, pivot means having a pivot axis for pivotally connecting said obliquely extending arm at said vehicle superstructure, said pivot means having a pivot axis which intersects the vehicle longitudinal center plane rearwardly of the point of intersection of the swing axis of said pivotal connecting means therewith, said other arm portion being constituted by a torsion-absorbent strut and by form-rigid shells, and means for adjustably securing said strut at said shells and rigidly connecting said shells with said obliquely directed one arm portion.

4. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two arm portions which intersect one another within the area of said drive shaft means, the ends of said arm portions facing the respective wheel subtending an angle which essentially corresponds to the angle of the ends of said arm portions opposite said wheel, one of said arm portions being disposed obliquely to the vehicle longitudinal center plane and the other arm portion extending substantially parallel thereto, said one arm portion extending through said other arm portion in proximity to the respective drive shaft means, said other arm portion being constituted by a torsion-absorbent strut and by form-rigid shells, and means for adjustably securing said strut at said shells and rigidly connecting said shells with said obliquely directed one arm portion, spring means for spring supporting the respective wheel at said vehicle superstructure including torsion rod spring means and means operatively connecting said strut with said torsion rod spring means, and said shells which are completed into a hollow body being cranked underneath said drive shaft means and forming the support for a shock absorber.

5. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, the ends of said arm portions facing the respective wheel subtending an angle which essentially corresponds to the angle of the ends of said arm portions opposite said wheel, one of said arm portions being disposed obliquely to the vehicle longitudinal center plane, and said other arm portion being flexible and connected to said pivotal connecting means for pivoting about a swing axis substantially perpendicular to said vehicle longitudinal center plane, the obliquely directed arm portion carrying a wheel hub and being provided on the opposite end thereof with pivot means for enabling pivoting of said one arm portion at said vehicle superstructure including a head piece, a bracket rigidly connected with said vehicle superstructure, and means for adjustably connecting said head piece with said bracket to enable adjustments in the vertical direction, said pivot means having a pivot axis which intersects the vehicle longitudinal center plane rearwardly of the point of intersection of the swing axis of said pivotal connecting means therewith.

6. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, the ends of said arm portions facing the respective wheel subtending an angle which essentially corresponds to the angle of the ends of said arm portions opposite said wheel, one of said arm portions being disposed obliquely to the vehicle longitudinal center plane, and said other arm portion being flexible and connected to said pivotal connecting means for pivoting about a swing axis substantially perpindicular to said vehicle longitudinal center plane, the obliquely directed arm portion carrying a wheel hub and being provided on the opposite end thereof with pivot means for enabling pivoting of said one arm portion at said vehicle superstructure including a head piece, a bracket rigidly connected with said vehicle superstructure, and means for adjustably connecting said head piece with said bracket to enable adjustments in the vertical direction, said pivot means having a pivot axis which intersects the vehicle longitudinal center plane rearwardly of the point of intersection of the swing axis of said pivotal connecting means therewith, and torsion rod stabilizer means operatively connecting the wheel guiding means on opposite sides of the vehicle including an angularly bent arm portion pivotally connected at said obliquely directed arm portion within the area between the head piece and the other arm portion.

7. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, one of said arm portions being disposed obliquely to the vehicle longitudinal center plane and the other arm portion extending substantially parallel thereto, said one arm portion extending through said other arm portion in proximity to the respective drive shaft means, and said other arm portion being flexible and connected to said pivotal connecting means for pivoting about a swing axis substantially perpendicular to said vehicle longitudinal center plane, the obliquely directed arm portion carrying a wheel hub and being provided on the opposite end thereof with pivot means for enabling pivoting of said one arm portion at said vehicle superstructure including a head piece, a bracket rigidly connected with said vehicle superstructure, and means for adjustably connecting said head piece with said bracket to enable adjustments in the vertical direction, said pivot means having a pivot axis which intersects the vehicle longitudinal center plane rearwardly of the point of intersection of the swing axis of said pivotal connecting means therewith, and torsion rod stabilizer means operatively connecting the wheel guiding means on opposite sides of the vehicle including an angularly bent arm portion pivotally connected at said obliquely directed arm portion within the area between the head piece and the other arm portion.

8. In a wheel suspension for vehicles, especially rear wheel suspension for motor vehicles, in which the wheels are connected with a multi-partite wheel guide member adapted to swing approximately in the driving direction and are in driving connection with the differential gear over swinging drive shafts with the use of universal joints, the improvement essentially consisting of a wheel guide structure constituted by arms that intersect and are positively secured to one another within the area of the respective drive shaft at a point spaced from the respective wheel, one of said arms extending obliquely and the other arm extending approximately parallel with respect to the vehicle longitudinal center plane and being flexible and connected to said pivotal connecting means for pivoting about a swing axis substantially perpendicular to said vehicle longitudinal center plane, the arm extending approximately parallel to the vehicle central longitudinal plane being constituted by a torsion-absorbent strut and by form-rigid shell members, means securely connecting said shell members to the obliquely extending arm, and means for varying the toe-in adjustment of a wheel by adjustably securing said strut at the shell members, pivot means having a pivot axis for pivotally connecting said obliquely extending arm at said vehicle superstructure, said pivot means having a pivot axis which intersects the vehicle longitudinal center plane rearwardly of the point of connection of the swing axis of said pivotal connecting means therewith.

9. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, one of said arm portions being disposed obliquely to the vehicle longitudinal center plane and the other arm portion extending substantially parallel thereto, said one arm portion extending through said other arm portion in proximity to the respective drive shaft means, and said other arm portion being flexible and connected to said pivotal connecting means for pivoting about a swing axis substantially perpendicular to said vehicle longitudinal center plane, said other arm portion being constituted by a torsion-absorbent strut and by form-rigid shells, and means for adjustably securing said strut at said shells and rigidly connecting said shells with said obliquely directed one arm portion, spring means for spring supporting the respective wheel at said vehicle superstructure including torsion rod spring means and means operatively connecting said strut with said torsion rod springs means, and said shells which are completed into a hollow body being cranked underneath said drive shaft means and forming the support for a shock absorber, the obliquely directed arm portion carrying thereon a wheel hub and being provided on the opposite end thereof with pivot means for enabling pivoting of said one arm portion at said vehicle superstructure including a head piece, a bracket rigidly connected with said vehicle superstructure, and means for adjustably connecting said head piece with said bracket to enable adjustments in the vertical direction, said pivot means having an axis which intersects the vehicle longitudinal center plane rearwardly of the point of intersection of the swing axis of said pivotal connecting means therewith, and torsion rod stabilizer means operatively connecting the wheel guiding means on opposite sides of the vehicle including an angularly bent arm portion pivotally connected at said obliquely directed arm portion within the area between the head piece thereof and said strut.

10. In a wheel suspension for vehicles, especially rear wheel suspension for motor vehicles, in which the wheels are connected with a multi-partite wheel guide member including pivotal connecting means adapted to swing approximately in the driving direction and are in driving connection with the differential gear over swinging drive shafts with the use of universal joints, the improvement essentially consisting of a wheel guide structure constituted by arms that intersect and are positively secured to one another within the area of the respective drive shaft at a point spaced from the respective wheel, one of said arms extending obliquely and the other arm extending approximately parallel with respect to the vehicle longitudinal center plane, and said other arm portion being flexible and connected to said pivotal connecting means for pivoting about a swing axis substantially perpendicular to said vehicle longitudinal center plane, and means for adjustably securing said obliquely directed arm portion at said vehicle superstructure to enable camber adjustment of the respective wheel by an adjustment of said obliquely directed arm in the vertical direction, pivot means having a pivot axis for pivotally connecting said obliquely extending arm at said vehicle superstructure, said pivot means having a pivot axis which intersects the vehicle longitudinal center plane rearwardly of the point of connection of the swing axis on said pivotal connecting means therewith.

11. In a wheel suspension for vehicles, especially rear wheel suspension for motor vehicles, in which the wheels are connected with a multi-partite wheel guide member adapted to swing approximately in the driving direction and are in driving connection with the differential gear over swinging drive shafts with the use of universal joints, the improvement essentially consisting of a wheel guide structure constituted by arms that cross one another within the area of the respective drive shaft, one of said arms extending obliquely and the other arm extending approximately parallel with respect to the vehicle longitudinal center plane, the arm extending approximately parallel to the vehicle central longitudinal plane being constituted by a torsion-absorbent strut and by form-rigid shell members, means securely connecting said shell members to the obliquely extending arm, and means for varying the toe-in adjustment of a wheel by adjustably securing said strut at the shell members, and means for adjustably securing said obliquely directed arm portion at said vehicle superstructure to enable camber adjustment of the respective wheel by an adjustment of said obliquely directed arm in the vertical direction.

12. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, one of said arm portions being disposed obliquely to the vehicle longitudinal center plane, and said other arm portion being flexible and connected to said pivotal connecting means for pivoting about a swing axis substantially perpendicular to said vehicle longitudinal center plane, the other arm portion being constituted at least in part by a torsion-absorbent strut, and spring means for spring supporting the respective wheel at said vehicle superstructure including torsion rod spring means and means operatively connecting said strut with said torsion rod spring means, pivot means having a pivot axis for pivotally connecting said obliquely extending arm at said vehicle superstructure, said pivot means having a pivot axis which intersects the vehicle longitudinal center plane rearwardly of the point of intersection of the swing axis of said pivotal connecting means therewith.

13. A rear wheel suspension for vehicles, especially motor vehicles having a relatively fixed vehicle superstructure and a differential gear, comprising:

wheel guide means for independently suspending a respective vehicle wheel from said vehicle superstructure including pivotal connecting means to enable swinging movement of said wheel guide means substantially in the driving direction, and drive shaft means including universal joint means for drivingly connecting a respective wheel with said differential gear, said wheel guide means including two intersecting arm portions positively secured to one another within the area of said drive shaft means at a point spaced from the respective wheel, one of said arm portions being disposed obliquely to the vehicle longitudinal center plane, and said other arm portion being flexible and connected to said pivotal connecting means for pivoting about a swing axis substantially perpendicular to said vehicle longitudinal center plane, means for adjustably connecting said one arm portion to said superstructure to enable adjustments in the vertical direction, the other arm portion being constituted at least in part by a torsion-absorbent strut, and spring means for spring supporting the respective wheel at said vehicle superstructure including torsion rod spring means and means operatively connecting said strut with said torsion rod spring means, pivot means having a pivot axis for pivotally connecting said obliquely extending arm at said vehicle superstructure, said pivot means having a pivot axis which intersects the vehicle longitudinal center plane rearwardly of the point of intersection of the swing axis of said pivotal connecting means therewith.

References Cited by the Examiner

UNITED STATES PATENTS

| | | | |
|---|---|---|---|
| 2,083,085 | 6/37 | Palmer | 180—73 |
| 2,254,261 | 9/41 | Best | 280—124 |
| 3,002,580 | 10/61 | Mueller et al. | 180— |
| 3,102,736 | 9/63 | Uhlenhaut et al. | 180— |

FOREIGN PATENTS 920,109  11/54  Germany.

BENJAMIN HERSH, *Primary Examiner.*

A. HARRY LEVY, *Examiner.*